United States Patent Office 3,318,848
Patented May 9, 1967

3,318,848
MELT HYDROLYSIS OF OXYMETHYLENE COPOLYMERS
Charles M. Clarke, Springfield, N.J., assignor to Celanese Corporation of America, New York, N.Y., a corporation of Delaware
No Drawing. Filed June 20, 1963, Ser. No. 289,389
6 Claims. (Cl. 260—67)

This invention relates to stabilized polymers and, more particularly, to polymers which are comparatively stable against degradation but which are derived from polymers which have a higher susceptibility to such degradation. The invention also relates to method of stabilizing such polymers.

Certain polymers are comprised of comparatively stable and comparatively unstable monomeric units and many times the resistance of such polymers to degradation depends upon the relative location of the aforementioned stable and unstable monomeric units. For example, if a polymer is susceptible to degradation by a mechanism which attacks the ends of the polymer molecules it can be seen that if the ends of the molecules are susceptible to degradation, the polymer will have less stability than if the molecule ends are relatively stable to degradation.

While the subject invention will be described with reference to thermally stabilized oxymethylene polymers it should not be limited thereto as the principles of the invention are applicable to other polymers having appropriate stable and unstable units.

In general, the invention involves the stabilization of a polymer having stable and unstable units in its molecules by treating the polymer in such a way as to selectively degrade the polymer and remove unstable units from its molecules.

In a preferred embodiment of this invention there is provided a method of stabilizing a heterogeneous polymer against thermal degradation wherein the unstabilized polymer is susceptible to such degradation inasmuch as it contains monomeric units of comparatively high susceptibility to thermal degradation which are interspersed with other monomeric units which are comparatively stable to thermal degradation. The invention comprises subjecting the polymer to a treatment to degrade the end portions of the molecules of the polymer which are made up of the comparatively susceptible monomeric units thereby leaving a residual polymer having the comparatively stable monomeric units in terminal portions of its molecules. In one embodiment of this invention at least 90% of the polymeric chains of the molecules of the treated polymer have comparatively stable, or comparatively thermal-resistant, units in terminal positions.

Oxymethylene polymers, having recurring —OCH$_2$— units directly attached to each other, have been known for many years. They may be prepared by the polymerization of anhydrous formaldehyde or by the polymerization of trioxane, which is a cyclic trimer of formaldehyde. High molecular weight oxymethylene polymers vary in thermal stability and, in accordance with a preferred embodiment of this invention, the polymer which is stabilized is an oxymethylene polymer containing carbon-to-carbon single bonds in the main polymer chain.

In a particularly preferred embodiment of our invention the polymeric compounds to be treated are oxymethylene copolymers having at least one chain containing recurring oxymethylene units interspersed with —OR— groups in the main polymer chain, where R is a divalent radical containing at least two carbon atoms directly linked to each other and positioned in the polymer chain between the two valences, with any substituents on said R radical being inert, that is those which are free of interfering functional groups and will not induce undesirable reactions. Particularly preferred are copolymers which contain from 60 to 99.6 mol percent of recurring oxymethylene groups. In a preferred embodiment R may be, for example, an alkylene or substituted alkylene group containing at least two carbon atoms.

Among the copolymers which may be utilized in accordance with this aspect of the invention are those having a structure comprising recurring units having the formula

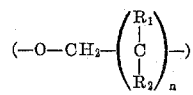

wherein $n$ is an integer from zero to 5 and wherein $n$ is zero in from 60 to 99.6 percent of the recurring units. $R_1$ and $R_2$ are inert substituents, that is, substituents which are free of interfering functional groups and will not induce undesirable reactions.

A preferred class of copolymers are those having a structure comprising oxymethylene and oxyethylene recurring units wherein from 60 to 99.6 percent of the recurring units are oxymethylene units.

Particularly preferred oxymethylene polymers are those having incorporated therein oxyalkylene units having adjacent carbon atoms which are derived from cyclic ethers having adjacent carbon atoms. These coplymers may be prepared by copolymerizing trioxane with a cyclic ether having the structure

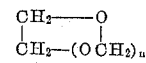

where $n$ is an integer from zero to 2.

Examples of preferred polymers include copolymers of trioxane and cyclic ethers containing at least two adjacent carbon atoms such as the copolymers disclosed in U.S. Patent No. 3,027,352 by Cheves T. Walling, Frank Brown and Kenneth W. Bartz, which patent is assigned to the same assignee as the subject application.

Among the specific cyclic ethers which may be used are ethylene oxide; 1,2-dioxolane; 1,3,5-trioxepane; 1,3-dioxane; trimethylene oxide; pentamethylene oxide; 1,2-propylene oxide; 1,2-butylene oxide; neopentyl formal; pentaerythritol diformal; paraldehyde; tetrahydrofuran and butadiene monoxide.

As used in the specification and claims of the subject application, the term "oxymethylene" includes substituted oxymethylene, where the substituents are inert with respect to the reactions in question, that is, the substituents are free of interfering functional groups and will not introduce undesirable reactions.

As used in the specification and claims of this application, the term "copolymer" means polymers having two or more monomeric groups, including terpolymers and higher polymers. Suitable terpolymers include those disclosed in U.S. patent application Ser. No. 229,715, filed October 10, 1962, by W. E. Heinz and F. B. McAndrew, which is assigned to the same assignee as the subject application.

The preferred polymers which are treated in this invention are thermoplastic materials having a melting point of at least 150° C. and are normally millable at a temperature of 200° C. They have a number average molecular weight of at least 10,000. These polymers have a high thermal stability before treatment in accordance with this invention but this stability is markedly improved by such treatment. For example, if a sample of the polymer which has been treated in accordance with this invention, and which has also been chemically stabilized as described below, is placed in an open vessel in a circulating air oven at a temperature of 230° C. and its weight loss is measured without removal of the sample from the oven, it will have a thermal degradation rate of less than 1.0 wt. percent/ min. for the first 45 minutes and, in preferred instances, less than 0.1 wt. percent/min. for the same period of time.

The preferred polymers which are treated in this invention have an inherent viscosity of at least one (measured at 60° C. in an 0.1 weight percent solution in p-chlorophenol containing 2 weight percent of α-pinene). After treatment the preferred copolymers exhibit remarkable alkaline stability. For example, if the treated copolymers are refluxed at a temperature of about 142°–145° C. in a 50% solution of sodium hydroxide in water for a period of 45 minutes, the weight of the copolymer will be reduced by less than one percent.

The preferred catalysts used in the preparation of the desired copolymers are boron fluoride and boron fluoride coordinate complexes with organic compounds, particularly those in which oxygen or sulfur is the donor atom.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is a preferred coordinate complex. The boron fluoride complex with diethyl ether is also very effective. Other boron fluoride complexes which may be used are the complexes with methyl acetate, with ethyl acetate, with phenyl acetate, with dimethyl ether, with methyl phenyl ether and with dimethyl sulfide. Suitable catalysts are disclosed in U.S. Patents 2,989,505, 2,989,506, 2,989,507, 2,989,509, all of which are by Donald E. Hudgin and Frank M. Berardinelli; 2,989,510, by George J. Bruni; and 2,989,511 by Arthur W. Schnizer. All the above patents are assigned to the same assignee as the subject application.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture, such as may be present in commercial grade reactants or may be introduced by contact with atmospheric air, will not prevent polymerization, but should be removed for best yields.

In preparing the preferred copolymers, the trioxane, cyclic ether and catalyst are disolved in a common anhydrous solvent such as cyclohexane, and permitted to react in a sealed reaction zone. The temperature in the reaction zone may vary from about 0.° C. to about 120° C. The period of reaction may vary from about 5 minutes to about 72 hours. Pressures from subatmospheric to about 100 atmospheres, or more, may be used, although atmospheric pressure is preferred.

The chemical constitution of the cyclic ether must be considered. Thus, 1,3-dioxolane contains both an oxymethylene group and an oxyethylene group. Its incorporation into the copolymer molecule increases both the oxymethylene and the oxyethylene content of the polymer molecule.

In general, the cyclic ether is present in the reaction mixture in amounts between about 0.2 and about 30 mol percent, based on the total mols of monomer. The optimum proportion will depend on the particular copolymer desired, the expected degree of conversion and the chemical constitution of the cyclic ether used.

The copolymers produced from the preferred cyclic ethers have a structure substantially composed of oxymethylene and oxyethylene groups in a ratio from about 250:1 to about 1.5:1.

Upon completion of the polymerization reaction it is desirable to neutralize the activity of the polymerization catalyst since prolonged contact with the catalyst degrades the polymer. The polymerization product may be treated with an aliphatic amine, such as tri-n-butylamine or triethylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of suitable methods of neutralizing catalyst activity may be found in U.S. Patent No. 2,989,509 by Donald E. Hudgin and Frank M. Berardinelli, assigned to the same assignee as the subject application.

In accordance with the subject invention the comparatively stable monomeric portions or units of the polymer may be removed by a process which comprises treating the polymer with a reactant under conditions such that the polymer-reactant system is in liquid form and continuing the reaction at an elevated temperature and pressure and for a period of time sufficient to remove the comparatively stable portions or units from the ends of the polymer molecules so that the molecules are terminated by comparatively stable units.

The polymer-reactant system may achieve liquid form by a number of methods, such as (1) melting the polymer and adding the reactant thereto under such conditions that the polymer-reactant system remains liquid or (2) mixing the polymer and the reactant and then heating until the polymer-reactant system is in liquid form.

When the copolymer is a heterogeneous copolymer with the comparatively unstable units being oxymethylene units, the preferred chemical treatment is an "hydrolysis" treatment under non-acidic, and preferably alkaline, conditions. In a preferred embodiment the polymer is reacted with from about 2 weight percent to about 25 weight percent of the preferred hydrolysis reactant. The reaction must take place at an elevated temperature and pressure such that the polymer-reactant system will remain in a liquid condition during the reaction. Thus the treatment may be referred to as a "molten hydrolysis" or "melt hydrolysis." The hydrolytic reactant may be water or an organic hydroxy-containing compound such as a primary, secondary or tertiary aliphatic or aromatic alcohol or mixtures thereof. Suitable alcohols include methyl alcohol, ethyl alcohol, n-propyl alcohol, isopropyl alcohol, secondary butyl alcohol, tertiary butyl alcohol, and other aliphatic alcohols; and benzyl alcohol, α-phenylethyl alcohol, β-phenylethyl alcohol, ortho-methylbenzyl alcohol, diphenyl carbinol, triphenyl carbinol, and other aromatic alcohols. As used herein the term "hydrolysis" includes the reaction of the polymer with water or the aforementioned organic hydroxy-containing materials or mixtures thereof.

The terminal units of the oxymethylene polymer are often hydroxy-substituted oxymethylene

(—O—CH$_2$—OH)

units and detachment of an oxymethylene group from the polymer molecule by the hydrolysis reaction has the effect of shifting the hydrogen atom of the hydroxyl group to the oxygen atom of the next adjacent oxymethylene group.

When oxyethylene units, for example, are incorporated in the polymer chain by copolymerization as described above, the successive detachment of oxymethylene units takes place until an oxyethylene unit becomes the terminal unit of the chain. The oxyethylene units, having carbon-to-carbon bonds therein, are comparatively resistant to such detachment, and remain attached to the polymeric chain in the terminal position and protect the internal oxymethylene units from further hydrolytic removal. Since oxyethylene units are also resistant to detachment by heat, the degraded molecule has a better initial thermal stability than the original copolymer from which it was derived.

It has been found that the products of the selective treatment of this invention, after substantially constant weight is achieved, are also extremely stable against attack by the reaction conditions. Therefore, in a preferred embodiment, the polymer is subjected to the reaction conditions until it achieves substantially constant weight. Thus, an oxymethylene copolymer having had the hydrolytic treatment, is not only thermally stable but is also extremely stable against such further hydrolytic treatment even at conditions more severe than those of the treatment and despite the fact that the polymer still has a substantial content of internal oxymethylene units which are normally subject to degradation by alkaline hydrolysis unless protected by suitable end groups which are resistant to degradation under such conditions.

In a preferred embodiment of this invention the molten polymer is subjected to the hydrolysis under alkaline conditions. The alkaline material is preferably water soluble, or soluble in the organic hydroxy-containing material, and may be a strongly basic hydroxide such as the hydroxide of an alkali metal, or alkaline earth metal, or it may be the salt of a strong base and weak acid, or it may be ammonia or an organic base, such as an amine or an amidine.

In a preferred embodiment the amount of alkaline material present in the chemical reaction is from 0.001 weight percent to about 10.0 weight percent, most preferably between about 0.001 weight percent and about 1.0 weight percent. When no alkaline material is used it may be desirable to have the reaction take place in a buffered system since the products of the hydrolysis are acidic and would thereupon cause the system to become acidic which might have deleterious effects on the polymer.

In addition alkaline hydrolysis is preferable over neutral hydrolysis since it is faster and since the alkaline material will neutralize any excess polymerization catalyst which might otherwise tend to degrade the polymer during the hydrolysis step.

After the polymerization reaction it may be desirable to subject the polymer to washing and drying in order to remove unreacted monomers, solvent and catalyst residues. However, in a preferred embodiment of this invention the copolymer is subjected to the melt hydrolysis treatment promptly after the completion of the polymerization reaction. In a particularly preferred embodiment of this invention, the active catalyst is neutralized by mixing the polymerization reactor product with a material which may also serve as the chemical reactant for the hydrolysis. Specifically water, or a mixture of an alcohol, such as methanol, and water, may be used in which small amounts of ammonia or an amine such as triethylamine may be present. The reactant may include unreacted materials from the polymerization reaction, such as trioxane. These materials do not ordinarily have an undesirable effect on the subsequent melt hydrolysis treatment, and may therefore be regarded as inert for this reaction.

In a preferred embodiment the reactant must be used in an amount between about 2 weight percent and about 25 weight percent of the polymer. The polymer reactant system is treated and maintained under conditions such that the polymer-reactant system remains in a liquid form. Thus satisfactory results may be obtained below the melting point of the polymer itself, as long as the polymer-reactant system is liquid. For example, a system containing 80 weight percent of a trioxane-2% ethylene oxide copolymer and 20 weight percent of a 60% water-40% methanol reactant has a melting point about 125° C., which is considerably below the melting point of the copolymer itself. However, temperatures somewhat above the melting point of the system are preferred, because the hydrolysis reaction rate increases with increase in temperature. In a preferred embodiment the polymer-reactant system is in a single phase. The melt hydrolysis reaction will normally not take place until sufficiently elevated temperatures and pressures are reached to place the polymer-reactant system in liquid form and the materials must be held at such temperature and pressure until the desired amount of unstable portions are removed from the ends of the polymer molecules.

On some occasions it may be desirable to mix the polymer with a larger amount of reactant and after the catalyst has been neutralized remove a portion of the reactant by filtering, vaporization, etc. in order to retain only between 2 and 25 weight percent of reactant present with the polymer during the melt hydrolysis reaction.

In another embodiment it may be desirable to neutralize the catalyst and then filter, wash and dry the polymer. The polymer may then be conveniently kept until it is subjected to the melt hydrolysis treatment at a later time.

In a preferred embodiment of this invention it is also desirable to incorporate one or more chemical stabilizers into the copolymer in order to bring its thermal degradation rate even lower. The proportion of stabilizer incorporatd depends upon the specific stabilizer used. A proportion between about 0.05 and 10 weight percent (based on the weight of polymer) has been found to be suitable for most stabilizers.

One suitable stabilizer system is a combination of (1) an anti-oxidant ingredient, such as phenolic anti-oxidant, and most suitably a substituted bisphenol, and (2) an ingredient to inhibit chain scission, generally a compound of a polymer containing trivalent nitrogen atoms.

A suitable class of substituted bisphenols are the alkylene bisphenols including compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis(4-methyl-6-tertiary butyl phenol) and 4,4'-butylidene bis(6-tertiary butyl-3-methyl phenol). Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrollidone, hydrazides, compounds having 1 to 6 amide groups, proteins, compounds having tertiary amine and terminal amide groups, compounds having amidine groups, cycloaliphatic amine compounds and aliphatic acylureas. The stabilizers may be present in the melt hydrolysis step or they may be added to the hydrolized polymer after the melt hydrolysis step.

After the melt hydrolysis reaction has been completed and a satisfactory amount of unstable monomeric units have been removed from the polymer molecules, the remaining chemical reactant is removed from the treated polymer. Also the degradation or reaction products and, on occasion, unreacted materials, such as trioxane, should also be removed. Formaldehyde is the principal melt hydrolysis degradation product of oxymethylene polymers and it is believed to be formed by the successive detachment of the terminal oxymethylene units from the end of the polymer chain. In some instances, particularly when the polymerization reaction product is promptly melt hydrolyzed, the hydrolyzed material may include some unreacted trioxane. In accordance with a preferred embodiment of this invention the chemical reactant, the formaldehyde, the trioxane and other volatilizable materials may be removed by suddenly reducing the prssure under which the materials have been maintained, which in view of the temperature, results in the volatilization of the volatile materials. The lower pressure should be between about 0.1 p.s.i.a. and 50 p.s.i.a. and is preferably accomplished by exposing the materials to atmospheric pressure or a slight vacuum (about 0.5 p.s.i.a.). Then, if desired, the stabilized polymer may be extruded and treated further. In certain instances after extrusion the extruded strands are pelletized and stored until the polymer is ready for use.

In a preferred embodiment of this invention the time during which the molten polymer is subjected to the elevated temperatures and pressures in the presence of the reactant (this time is known as residence time) falls between about 0.1 and about 15 minutes. The temperature range is preferably between about 160° C. and about 240° C. The pressure ranges preferably between about 150 p.s.i.a. and about 10,000 p.s.i.a. The residence time, temperature and pressure are interrelated and are preferably maintained so that the polymer-reactant system remains in the liquid state and the reaction proceeds sufficiently so that the desired amount of unstable units are removed from the ends of the polymer molecules so that they are terminated by comparatively stable units.

Unless stated otherwise, the following examples used a trioxane-ethylene oxide copolymer containing about 2 weight percent of oxyethylene groups distributed in the oxymethylene chains. Also unless otherwise stated the melt hydrolysis step of the examples took place in an extrusion device. In Examples 1–29 the reaction product from the polymerization reactor was washed with water and then with acetone and dried to neutralize and remove the catalyst and to remove unreacted trioxane. The dried product was then blended with chemical stabilizers. Specifically the polymer used in Examples 1–29 was blended with 0.15% melamine, 0.1% nitrilotrispropionamide and 0.5% 2,2′-methyl bis(4-methyl-6-tertiary butyl phenol). In Examples 1–29 a two-stage extrusion process was used. The dried polymer was fed to the extrusion apparatus which was a one inch single screw single vent extruder having a length to diameter ratio of 20/1. The polymer first passed through a 4.5/1 compression ratio metering or feed section having four turns with a forty mil channel depth. This is followed by a vented extraction or mixing section having three turns with a channel depth of 220 mils. The reactant was injected into the polymer through the vent by a positive displacement piston pump. The polymer-reactant system then passes through a pumping or reaction section having four turns with a channel depth of 60 mils. A valve is placed between the end of the screw and the extrusion die to maintain adequate pressure.

The melt hydrolysis reaction takes place primarily in the pumping section. The polymer-reactant system then passes through the die and, upon the loss of pressure after the system passes the valve, the reactant, formaldehyde, etc. is vaporized. Although this material has a high degree of stability, it was passed through the extruder a second time, with a vacuum applied to the vent, to densify the somewhat porous material. The $K_{D230}$ values indicated in Table I, for Examples 1–29 were those obtained after the second extrusion.

In a one-stage extrusion process, used in Examples 30–44, the polymer was stabilized with 0.1% cyanoguanidine and 0.5% 2,2′-methylene bis-(4-methyl-6-tertiary butyl phenol). The polymer, mixed with reactant, was force fed to a one inch single screw extruder having a length to diameter ratio of 20/1. The feed section of the extruder had five turns and a channel depth of 185 mils. Thus the polymer-reactant system is fed under pressure to the metering or melt hydrolysis section which has 6 turns with a channel depth of 60 mils. Next there is a restricted section of one and one-half turns with a channel depth of 22 mils. This restricted section maintains sufficient pressure in the melt hydrolysis section. The polymer-reactant system then passes to a vented section (which may be referred to as a low pressure section) having four turns with a channel depth of 220 mils. When the heated, pressurized polymer-reactant system passes to the vented section, the pressure is suddenly reduced and the formaldehyde, reactant, and other vaporizable components are vaporized and removed through the vent. The treated polymer then passes through a pumping (or pre-extrusion) section having 3½ turns with a channel depth of 60 mils, where the polymer is densified. The polymer is subsequently extruded through a die and prepared for use. Thus the polymer is melt hydrolyzed in a simple one-stage extrusion operation.

In Table I the columns denominated by $K_{D230}$ and $K_{D270}$ refer to the percent of polymer weight loss per minute, determined by heating the polymer in an open vessel in a circulating air oven at a temperature of 230° C. or 270° C. as indicated. Prior to the melt hydrolysis treatment, the polymer treated in Table I had a $K_{D230}$ of 0.05–0.07. (see Table I).

TABLE I

| Ex. | Reactant | Residence, time-min. | Percent $NH_3$ in Reactant | Percent Reactant | Temp., °C. | $K_{D230}$, percent/min. | $K_{D270}$ | Percent wt. Loss 5½ hrs. at 230° | Pressure, p.s.i. | Extrusion Rate, g./min. |
|---|---|---|---|---|---|---|---|---|---|---|
| 1 | 50/50 Trioxane/water | 1.5 | 0.1 | 13.2 | 204 | 0.021 | | | | 25–30 |
| 2 | 60/40 Methyl alcohol/water. | 1.5 | 0.05 | 6.3 | 218 | 0.019 | | | | 25–30 |
| 3 | do | 1.5 | 0.05 | 20.4 | 204 | 0.013 | | | | 25–30 |
| 4 | do | 1.5 | 0.05 | 22.5 | 200 | 0.019 | | | | 25–30 |
| 5 | do | 1.5 | 0.05 | 13.3 | 204 | 0.013 | | | | 25–30 |
| 6 | do | 1.5 | | 5.8 | 204 | 0.024 | | | | 25–30 |
| 7 | do | 1.5 | | 11.8 | 177 | 0.023 | | | | 25–30 |
| 8 | do | 1.5 | | 9.7 | 221 | 0.032 | | | | 25–30 |
| 9 | do | 1.5 | 0.05 | 12.1 | 177 | 0.015 | | | | 25–30 |
| 10 | do | 1.5 | 0.1 | 7.2 | 177 | 0.020 | | | | 25–30 |
| 11 | do | 1.5 | 0.1 | 13.2 | 177 | 0.018 | | | | 25–30 |
| 12 | do | 1.5 | 0.1 | 5.7 | 204 | 0.019 | | | | 25–30 |
| 13 | do | 1.5 | 0.1 | 10.0 | 204 | 0.015 | | | | 25–30 |
| 14 | do | 1.5 | 0.1 | 18.6 | 204 | 0.011 | | | | 25–30 |
| 15 | do | | | 5 | 177 | | 0.252 | 10.4 | | |
| 16 | do | | 0.10 | 5 | 177 | | 0.222 | 8.5 | | |
| 17 | do | | 0.10 | 10 | 177 | | 0.192 | 10.2 | | |
| 18 | do | | | 10 | 204 | 0.024 | 0.157 | 6.6 | | |
| 19 | do | | | 20 | 204 | 0.027 | 0.168 | 7.8 | | |
| 20 | do | | 0.10 | 5 | 204 | 0.019 | 0.171 | 8.2 | | |
| 21 | do | | 0.10 | 20 | 204 | 0.011 | 0.170 | 8.0 | | |
| 22 | do | | 0.10 | 5 | 221 | 0.012 | 0.145 | 5.4 | | |
| 23 | do | 0.9 | 0.05 | 10 | 204 | 0.018 | | | | 47.7 |
| 24 | do | 3.2 | 0.05 | 10 | 204 | 0.016 | | | | 12.4 |
| 25 | Water | 1.1 | | 10 | 177 | 0.015 | | | | 39.0 |
| 26 | do | 1.5 | | 10 | 177 | 0.017 | | | | 26.9 |
| 27 | do | 3.5 | | 10 | 177 | 0.013 | | | | 11.8 |
| 28 | do | | 0.1 | 10 | 204 | 0.014 | | | | 25–30 |
| 29 | do | | | 10 | 204 | 0.022 | | | | 25–30 |
| 30 | 60/40 Methyl alcohol/water. | 0.79 | 0.05 | 10 | 191 | 0.015 | | | 700 | 18.7 |
| 31 | do | 0.44 | 0.05 | 10 | 191 | 0.024 | | | 1,500 | 33.6 |
| 32 | do | 0.26 | 0.05 | 10 | 191 | 0.040 | | | 1,400 | 56.0 |
| 33 | do | 0.83 | 0.05 | 10 | 191 | 0.024 | | | 900 | 17.7 |
| 34 | do | 0.91 | 0.05 | 10 | 191 | .020 | | | 600 | 16.2 |
| 35 | do | 0.31 | 0.05 | 10 | 191 | .042 | | | 1,100 | 47.6 |
| 36 | do | 1.20 | 0.05 | 10 | 177 | .021 | | | 900 | 12.2 |
| 37 | do | 0.60 | 0.05 | 10 | 177 | .027 | | | 1,400 | 24.6 |

TABLE I—Continued

| Ex. | Reactant | Residence, time-min. | Percent $NH_3$ in Reactant | Percent Reactant | Temp., °C | $K_{D230}$, percent/min. | $K_{D270}$ | Percent wt. Loss 5½ hrs. at 230° | Pressure, p.s.i. | Extrusion Rate, g./min. |
|---|---|---|---|---|---|---|---|---|---|---|
| 33 | 60/40 Methyl alcohol/water. | 1.4 | 0.05 | 10 | 177 | .033 | | | 700 | 10.5 |
| 39 | ----do---- | 0.70 | 0.05 | 10 | 177 | .044 | | | 750 | 20.7 |
| 40 | ----do---- | 1.66 | 0.05 | 10 | 177 | .015 | | | 700 | 8.8 |
| 41 | ----do---- | 1.00 | 0.05 | 10 | 177 | .038 | | | 600 | 14.7 |
| 42 | ----do---- | 1.36 | 0.05 | 10 | 191 | .015 | | | | |
| 43 | ----do---- | 1.04 | *0.05 | 10 | 191 | .017 | | | | |
| 44 | Water | 1.12 | 0.05 | 10 | 191 | .018 | | | | |

* Triethylamine rather than ammonia.

Table II shows results obtained with the same polymers which were treated in Table I, chemically stabilized and extruded as in Examples 30–44. All examples in Table II were treated under identical conditions except as noted therein.

TABLE II

| Ex. | Reactant | Residence Time, min. | Percent Reactant | Temp., °C | $K_{D230}$ |
|---|---|---|---|---|---|
| 1 | None | 0.6 | 0 | 204 | 0.06 |
| 2 | ----do---- | 1.1 | 0 | 204 | 0.051 |
| 3 | 60/40 Methyl alcohol/water +0.05% $NH_3$. | 0.56 | 10 | 191 | 0.038 |
| 4 | ----do---- | 0.82 | 10 | 191 | 0.027 |
| 5 | ----do---- | 0.61 | 10 | 219 | 0.024 |
| 6 | ----do---- | 1.23 | 10 | 219 | 0.015 |

Table II indicates the importance of the reactant. Here again the chemically stabilized copolymer had a $K_{D230}$ of 0.05–0.07 prior to treatment.

A terpolymer of trioxane, 2.0% ethylene oxide and 0.6% vinyl cyclohexene dioxide was chemically stabilized and extruded as in Examples 30–44 of Table I. The reactant was 10% water with 0.05% triethylamine. The residence time was 1.29 minutes at an average temperature of 194° C. The treated polymer had a $K_{D230}$ of 0.024.

It is to be understood that the foregoing detailed description is given merely by way of illustration and that many variations may be made therein without departing from the spirit of my invention.

The embodiments of the invention in which an exclusive property or privilege is claimed are defined as follows:

1. In a process for the stabilization of a normally solid oxymethylene copolymer having a melting point above about 150° C., the molecules of said copolymer containing from 60 to 99.6 mol percent of comparatively unstable monomeric oxymethylene units interspersed with comparatively stable monomeric —OR— units wherein R is a divalent radical containing at least two carbon atoms directly linked to each other and positioned in the polymer chain between the two valences, with any substituents on said R radical being inert, at least part of the terminal portions of said molecules comprising said unstable monomeric units, the improvement which comprises
   (a) introducing into a reaction zone said copolymer and from about 2 to about 25 weight percent, based on the copolymer, of a reactant selected from the class consisting of water, alcohols, and mixtures thereof,
   (b) forming a melt consisting essentially of the copolymer and reactant in said zone by maintaining the reaction zone at a temperature in the range of from about 160 to 240° C., and at a pressure in the range of from about 150 to 10,000 p.s.i.a., and
   (c) reacting the molten copolymer with the reactant under the above conditions of temperature and pressure for a period of time in the range of from about 0.1 to about 15 minutes to remove unstable monomeric oxymethylene units from the terminal portion of the copolymer molecules so that at least 90 percent of the resulting polymeric chains of the molecules are terminated by the stable monomeric units.

2. The process of claim 1 wherein the temperature is above the melting point of the polymer.

3. The process of claim 1 wherein said stable units are oxyethylene units.

4. The process of claim 1 wherein any unreacted reactant is removed from the resulting stabilized copolymer by reducing the pressure in said reaction zone to a pressure in the range of from about 0.1 to about 50 p.s.i.a. to volatilize the unreacted reactant.

5. The process of claim 1 wherein the alcohol is selected from the class consisting of methyl alcohol, ethyl alcohol, n-propyl alcohol, isopropyl alcohol, secondary butyl alcohol, tertiary butyl alcohol, benzyl alcohol, α-phenylethyl alcohol, β-phenylethyl alcohol, ortho-methylbenzyl alcohol, diphenyl carbinol, and triphenyl carbinol.

6. The process of claim 1 wherein the copolymer is reacted with the reactant under alkaline conditions.

References Cited by the Examiner

UNITED STATES PATENTS

| | | | |
|---|---|---|---|
| 2,963,470 | 12/1960 | Lanning | 260—94.94 |
| 2,964,515 | 12/1960 | Rader | 260—94.9 |
| 2,989,509 | 6/1961 | Hudgin et al. | 260—67 |
| 3,023,203 | 2/1962 | Dye | 260—94.94 |
| 3,103,499 | 9/1963 | Dolce | 260—67 |
| 3,118,859 | 1/1964 | Delassus | 260—67 |
| 3,174,948 | 3/1965 | Wall et al. | 260—67 |
| 3,219,623 | 11/1965 | Berardinelli | 260—95.95 |
| 3,225,005 | 12/1965 | Asmus et al. | 260—67 |

FOREIGN PATENTS

| | | |
|---|---|---|
| 353,165 | 3/1961 | Switzerland. |
| 921,436 | 3/1963 | Great Britain. |
| 1,251,409 | 12/1960 | France. |
| 1,253,488 | 1/1961 | France. |

WILLIAM H. SHORT, *Primary Examiner.*

L. M. PHYNES, *Assistant Examiner.*